United States Patent
Kashtan et al.

(10) Patent No.: US 12,217,100 B2
(45) Date of Patent: Feb. 4, 2025

(54) LATENCY SENSITIVE WORKLOAD BALANCING

(71) Applicant: RED HAT, INC., Raleigh, NC (US)

(72) Inventors: Yuval Kashtan, Tel Aviv (IL); Gal Hammer, Kfar Saba (IL)

(73) Assignee: Red Hat, Inc., Raleigh, NC (US)

( * ) Notice: Subject to any disclaimer, the term of this patent is extended or adjusted under 35 U.S.C. 154(b) by 218 days.

(21) Appl. No.: 17/081,860

(22) Filed: Oct. 27, 2020

(65) Prior Publication Data
US 2022/0129327 A1  Apr. 28, 2022

(51) Int. Cl.
G06F 9/50 (2006.01)
G06F 9/48 (2006.01)

(52) U.S. Cl.
CPC .......... G06F 9/5083 (2013.01); G06F 9/4881 (2013.01)

(58) Field of Classification Search
CPC ..... G06F 9/5083; G06F 9/4881; G06F 9/4887
See application file for complete search history.

(56) References Cited

U.S. PATENT DOCUMENTS

| | | | | |
|---|---|---|---|---|
| 6,442,631 B1 * | 8/2002 | Neufeld | ................... | G06F 13/18 710/264 |
| 8,327,187 B1 * | 12/2012 | Metcalf | ................... | G06F 9/544 714/10 |
| 10,152,349 B1 | 12/2018 | Anand | | |
| 10,452,572 B2 | 10/2019 | Lu et al. | | |
| 10,599,438 B2 | 3/2020 | Vembu et al. | | |
| 2009/0125909 A1 * | 5/2009 | Li | ................... | G06F 9/5038 718/103 |
| 2011/0066830 A1 * | 3/2011 | Wolfe | ................... | G06F 12/0862 712/E9.034 |
| 2014/0052882 A1 * | 2/2014 | Waters | ................... | G06F 9/4843 710/267 |
| 2014/0223429 A1 * | 8/2014 | Castelino | ................... | G06F 9/4401 718/1 |

(Continued)

OTHER PUBLICATIONS

Delgado et al. "New Insights into the Real-Time Performance of a Multicore Processor" IEEE Access 8 (2020), pp. 186199-186211. (Year: 2020).*

(Continued)

*Primary Examiner* — Meng Ai T An
*Assistant Examiner* — Illy W Huaracha
(74) *Attorney, Agent, or Firm* — Womble Bond Dickinson (US) LLP

(57) ABSTRACT

The technology disclosed herein enables an operating system kernel to schedule and perform load balancing of latency-sensitive tasks on processors that are otherwise excluded from a scope of load balancing performed by the kernel scheduler. An example method may include identifying, in an operating system of a computing device, one or more first tasks and one or more second tasks, where the second tasks are characterized by one or more latency constraints, identifying a first set of processors that are available for load balancing by a kernel scheduler of the operating system, scheduling execution of the first tasks on the first set of processors, identifying a second set of processors that are excluded from a scope of load balancing performed by the kernel scheduler, and scheduling execution of the second tasks on the second set of processors.

13 Claims, 6 Drawing Sheets

(56) References Cited

U.S. PATENT DOCUMENTS

| | | | | |
|---|---|---|---|---|
| 2014/0304412 | A1* | 10/2014 | Prakash | H04L 69/40 709/226 |
| 2020/0117625 | A1* | 4/2020 | Browne | G06F 11/0724 |
| 2022/0027183 | A1* | 1/2022 | Lu | G06F 9/45558 |

OTHER PUBLICATIONS

Hu, Menglan, et al. "Adaptive scheduling of task graphs with dynamic resilience." IEEE Transactions on Computers 66.1, pp. 17-23. (Year: 2016).*

Kobus, Jacek et al. "Completely Fair Scheduler and its tuning." draft on Internet, pp. 1-8. (Year: 2009).*

Marta Rybczyńska, A Full Task-Isolation Mode for the Kernel, https://lwn.net/Articles/816298/, Eklektix, Inc., Apr. 6, 2020, 9 pages.

Alejandro Perez Ruiz, Mario Aldea Rivas, Michael Gonzalez Harbour, CPU Isolation on the Android OS for running Real-Time Applications, https://dl.acm.org/doi/pdf/10.1145/2822304.2822317, Software Engineering and Real-Time Group Universidad de Cantabria, Oct. 7-8, 2015, 7 pages.

Salman Taherizadeh, Vlado Stankovski, Dynamic Multi-level Autoscaling Rules for Containerized Applications, https://academic.oup.com/comjnl/article/62/2/174/4993728, Faculty of Civil and Geodetic Engineering, University of Ljubljana, Slovenia; Artificial Intelligence Laboratory, Jožef Stefan Institute, Jamova Slovenia, Jul. 1, 2017, 24 pages.

Abu Hena Al Muktadir and Ved P. Kafle, Prediction and Dynamic Adjustment of Resources for Latency-Sensitive Virtual Network Functions, https://ieeexplore.ieee.org/document/9059320/authors#authors, National Institute of Information and Communications Technology, Tokyo, Japan, 2020, pp. 235-242.

Michael Marty et al., Snap: A Microkernel Approach to Host Networking, https://dl.acm.org/doi/pdf/10.1145/3341301.3359657, Google, Inc., Oct. 27-30, 2019, pp. 309-413.

* cited by examiner

LATENCY SENSITIVE WORKLOAD BALANCING

TECHNICAL FIELD

The present disclosure is generally related to processor scheduling in computer systems, and more particularly, to latency-sensitive workload balancing.

BACKGROUND

Scheduling herein shall refer to allocation of processor resources, such as Central Processing Units ("CPUs") to tasks in computer systems. Scheduling may be performed by a component of an operating system, such as a kernel. The tasks being scheduled may be, for example, processes, threads, or the like. The tasks may be, for example, application program code being executed by the processor. The operating system may execute multiple tasks using timeslicing, in which each task is executed for an amount of time that corresponds to a time slice. The operating system may cause the processor to execute a different task after a time slice expires by performing a context switch operation, which may, for example, load data associated with the different task into the processor's registers. The next task to execute may be determined by an operating system component referred to as a scheduler. The scheduler may select the next task to be executed to that particular criteria is satisfied, e.g., so that processor time is divided evenly among tasks (to the extent possible), or that processor time is divided among tasks in proportion to priority levels associated with the tasks.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
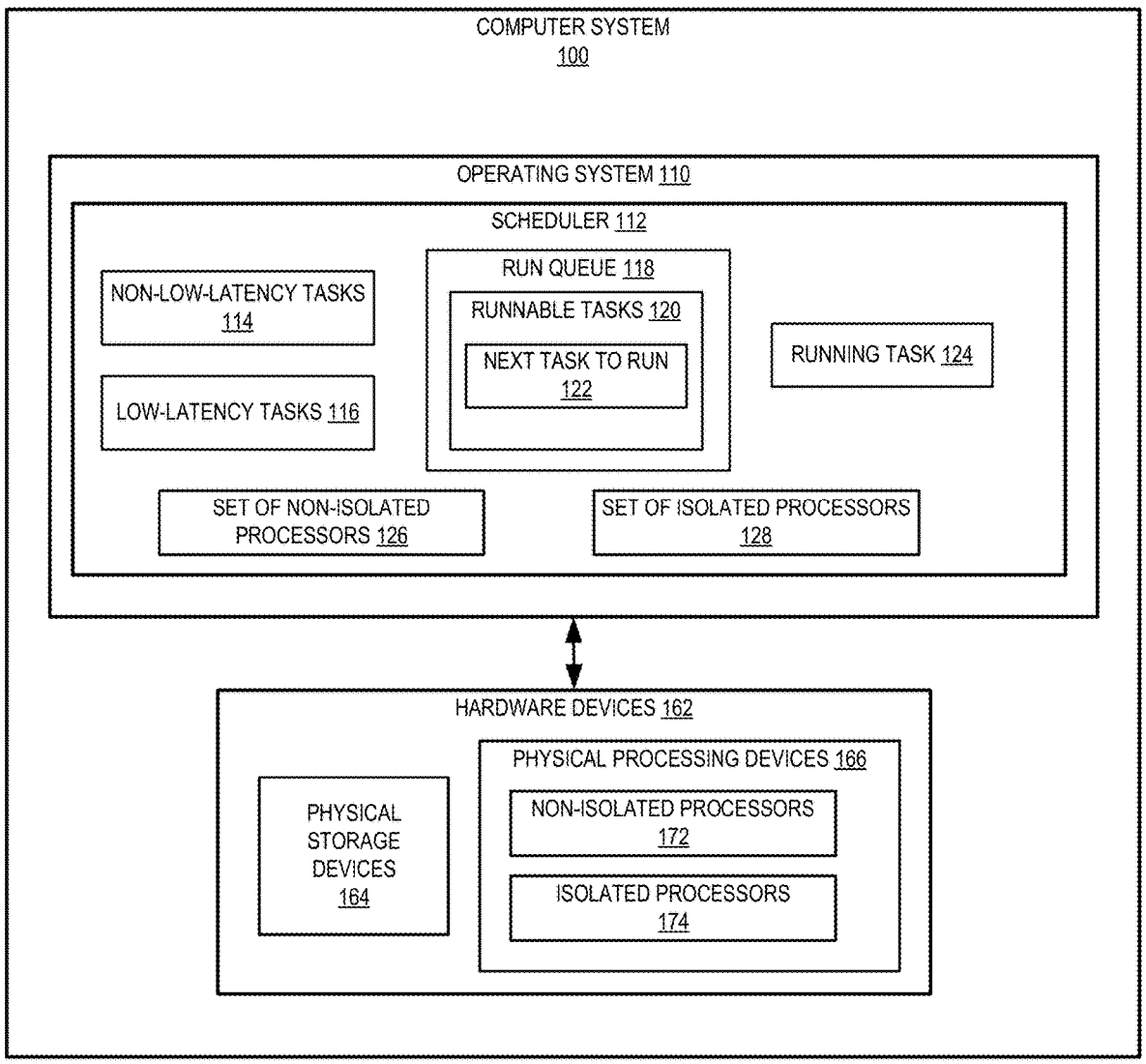
FIG. 1 depicts a high-level block diagram of an example host computer system that performs scheduling of tasks on isolated processors, in accordance with one or more aspects of the present disclosure.

Tasks being executed by an operating system can share a processor using time-slicing with task pre-emption between time slices. Each task can be pre-empted by the operating system so that another task can execute. The other tasks can be other applications or tasks performed by the operating system, for example. A scheduler component of the operating system can distribute execution of the tasks across one or more processors. The scheduler can determine which task to execute next, and the operating system can pre-empt a running task so that the next task can execute for one or more time slices. If multiple processors are available, a loadbalancer component of the scheduler can determine the processor on which each task is to be executed.

Although such multi-tasking techniques can allow a single processor to execute numerous tasks, unpredictable delays can occur during the execution of a task while the processor is being used by other tasks. Such delays can be undesirable or unacceptable in certain applications, such as real-time or near-real-time applications, low-latency applications, or other latency-sensitive applications. For example, a cellular networking platform may have time constraints related to cellular network protocol processing. If the networking platform program code does not meet the time constraints, then communication errors, loss of data, or other problems may occur. Certain operating systems thus provide a processor isolation feature that can be used to designate one or more particular processors (or processor cores) as "isolated" processors that are excluded from a scope of load balancing performed by the kernel scheduler. The kernel scheduler kernel scheduler does not create new tasks on or move existing tasks to such excluded processors. The isolated processors may be accessible to applications through specific interfaces that can be used to create or move tasks. For example, in the LINUX operating system, the "taskset" command can be used to create a task on a specified isolated processor, or the "sched_setaffinity" system call can be used to specify an isolated processor on which a task is to run. Applications are ordinarily responsible for performing the task management operations involved in creation or movement of tasks on isolated processors. Such task management operations are not the focus of most applications, so applications that do use isolated processors ordinarily perform relatively simple task management, such as running all application tasks on a single isolated processor. The term "task" shall refer herein to a process, thread, or other runnable instance of computer program code instructions. The term "processor" shall refer herein to a unit that executes instructions, such as a uniprocessor CPU, or a "core" of a multi-processor CPU.

Isolated processors are suitable for use by latency-sensitive applications because the operating system does not pre-empt tasks executing on isolated processors. That is, a latency-sensitive application executing on an isolated processor can execute without being interrupted by other tasks, and can predictably meet time constraints. Latency-sensitive applications can be associated with latency constraints that specify threshold latency tolerances.

However, since isolated processors are excluded from the scope of the operating system scheduler, a latency-sensitive application ordinarily runs on a single isolated processor to which it is initially assigned, unless the application performs specific operations to cause it to use a different processor. Further, if multiple latency-sensitive tasks are initiated by an application, all of the initiated tasks may be executed on a single isolated processor if the application does not perform the above-described task management operations needed to assign different isolated processor to different tasks. Thus, although applications can use multiple or specific isolated processors via appropriate program code, such program code is not ordinarily included in applications. As a result, latency-sensitive applications do not ordinarily use multiple processors (or processor cores), even though multiple processors (or cores) are often available in computer systems. Further, latency-sensitive applications do not move to different isolated processors (or cores).

As an example, a containerized workload can be managed by an external workload scheduler, such as KUBERNETES or the like, that does not itself perform load balancing to distribute the workload across CPUs. Since the containerized workload scheduler may start its tasks on a single isolated processor, each containerized workload task that is started on a fully-isolated processor ordinarily runs on that single isolated processor. Thus, even if multiple isolated processors (e.g., multiple cores) are available, the tasks of the containerized workload execute on a single isolated processor.

Aspects of the present disclosure address the above and other deficiencies by providing technology that enables an operating system, in addition to scheduling latency-insensitive tasks (e.g., user space applications) to run on non-isolated processors, also to schedule latency-sensitive tasks to run on isolated processors. Scheduling latency-sensitive tasks to run on isolated processors using the operating system scheduler can cause the latency-sensitive tasks to be load-balanced across the isolated processors. Scheduling of latency-sensitive tasks on isolated processors can be performed by identifying one or more latency-sensitive tasks by an operating system of a computing device, such that each of the latency-sensitive tasks is characterized by one or more latency constraints, identifying a set of isolated processors of the computing device that are excluded from a scope of load balancing performed by the kernel scheduler, and scheduling execution of the latency-sensitive tasks on the isolated processors. The latency-sensitive tasks are then executed on the identified set of isolated processors according to the scheduling, e.g., in an order and on processors determined by the scheduling. The scheduling can be performed by the kernel scheduler, for example, so that the latency-sensitive tasks are load-balanced across the set of isolated processors.

In an illustrative example, a computer system has 8 processors, and 3 of the processors are designated as isolated processors. The remaining 5 processors are designated as non-isolated processors. Latency-sensitive tasks can be distributed across the 3 isolated processors by the scheduler. For example, if there are 6 latency-sensitive tasks, then 2 latency-sensitive tasks can be allocated to each of the 3 isolated processors by the scheduler. The scheduler can move latency-sensitive tasks to different isolated processors as needed during execution of the latency-sensitive tasks to balance the workload across the isolated processors.

The latency-insensitive tasks (e.g., user space applications) can be distributed across the five non-isolated processors by the scheduler. For example, if there are 15 non-latency-sensitive tasks, then 3 non-latency-sensitive tasks can be allocated to each of the 5 non-isolated processors by the scheduler. The scheduler can move non-latency-sensitive tasks to different non-isolated processors as needed during execution of the non-latency-sensitive tasks to balance the workload across the non-isolated processors.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machine 110, hypervisor 120, hardware devices 130, a network 140, and a Peripheral Component Interconnect (PCI) device 150.

Computer system 100 may include an operating system 110. Operating system 110 may be, for example, UNIX, LINUX, MICROSOFT WINDOWS, APPLE MACOS, or the like. Operating system 110 may include a scheduler 112, which may determine when tasks are to be run. The scheduler 112 may be a component of the operating system 110 kernel, for example. The scheduler 112 may schedule the execution of one or more non-low-latency tasks 114 and one or more low-latency-tasks 116. Non-low-latency tasks 114 may be independent of latency constraints. Low-latency tasks 116 may have associated latency constraints that specify threshold amounts of time, e.g., a number of time units such as seconds or milliseconds within which the low-latency task 116 is to respond to input or to perform an action. Low-latency tasks 116 may also be referred to as latency-sensitive, real-time, or near-real-time tasks.

The scheduler 112 may include a load balancer, which may determine on which physical processing device 166 each of the tasks 114, 116 is to be run. The scheduler 112 may include a run queue 118, which is a data structure used by scheduler 112 to store a queue, list, tree, or other representation of an ordered set of runnable tasks 120. Runnable tasks 120 may include a next task to run 122, e.g., a task to be executed after a running task 124 is pre-empted by the scheduler 112. The scheduler may cause the next task to run 112 to be run on a physical processing device 166 selected by the load balancer.

The scheduler 112 may select the physical processing device 166 on which the next task 112 is to run by selecting a representation of a physical processing device 166 from a set of non-isolated processors 126. The set of non-isolated processors may correspond to physical non-isolated processors 172. For example, if the next task to run 122 does not have latency constraints, the scheduler 112 may select one of the set of non-isolated processors 126 to run the next task to run 122. Alternatively, if the next task to run 122 has latency constraints, the scheduler 112 may select one of the isolated processors 128 to run the next task to run 122. The set of isolated processors 128 may correspond to physical isolated processors 174. For example, if the next task to run 122 has latency constraints, the scheduler 112 may select the physical processing device 166 on which to run the next task to run 122 from the set of isolated processors 128.

Hardware devices 162 may provide hardware resources and functionality for performing computing tasks. Hardware devices 162 may include one or more physical storage devices 164, one or more physical processing devices 166, other computing devices, or a combination thereof. One or more of hardware devices 162 may be split up into multiple separate devices or consolidated into one or more hardware devices. Some of the hardware devices shown may be absent from hardware devices 162 and may instead be partially or completely emulated by executable code.

Physical storage devices 164 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 164 may be physical memory and may include volatile memory devices (e.g., random access memory (RAM)), non-volatile memory devices (e.g., flash memory, NVRAM), and/or other types of memory devices. In another example, physical storage devices 164 may include one or more mass storage devices, such as hard drives, solid state drives (SSD)), other data storage devices, or a combination thereof. In a further example, physical storage devices 164 may include a combination of one or more memory devices, one or more mass storage devices, other data storage devices, or a combination thereof, which may or may not be arranged in a cache hierarchy with multiple levels.

Physical processing devices 166 may include one or more processors that are capable of executing the computing tasks. Each physical processing device 166 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 166 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a processor, central processing unit ("CPU"), or CPU core.

Figure 2A:
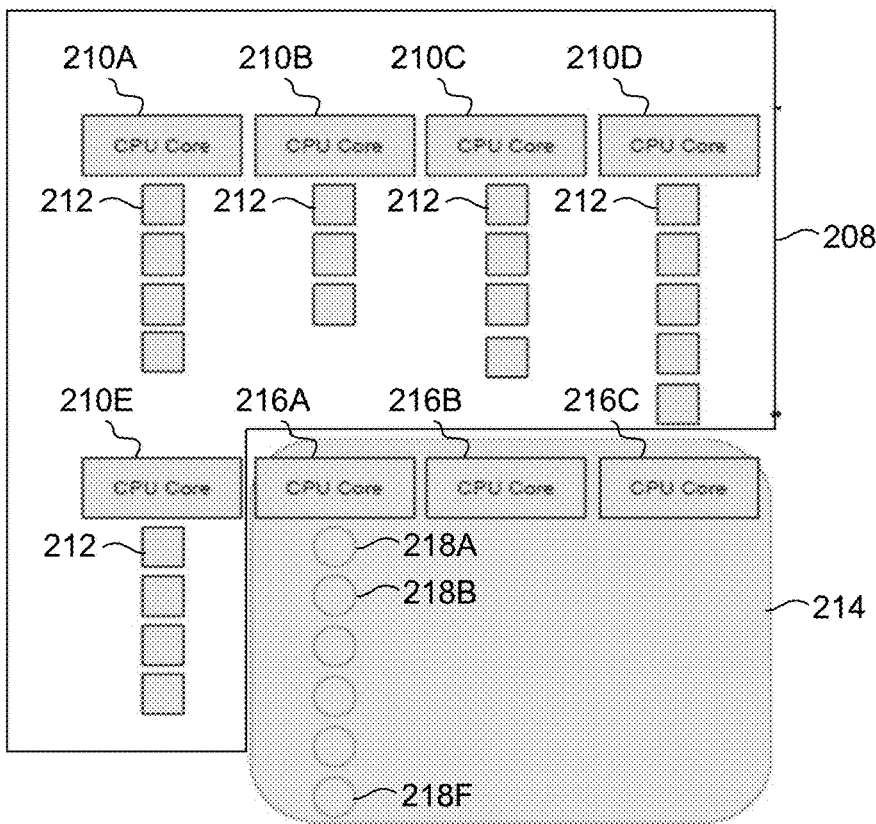
FIG. 2A depicts a diagram illustrating scheduling of tasks on a set of non-isolated processors and a single isolated processor, in accordance with one or more aspects of the present disclosure.

FIG. 2A depicts a diagram illustrating scheduling of tasks on a set of non-isolated processors and a single isolated processor, in accordance with one or more aspects of the present disclosure. A non-isolated processor set 208 includes 5 non-isolated processors 210A-E. A kernel scheduler performs load-balancing of running threads 212 on non-isolated processors 210A-E by scheduling the threads 212 on the non-isolated processors 210A-E. The threads 212 are balanced between the non-isolated processors 210A-E, as can be seen by the number of threads on each of the processors 210A-E being similar. For example, four threads 212 are located on the non-isolated processor 210A, three threads 212 are located on the non-isolated processor 210B, four threads 212 are located on the non-isolated processor 210C, five threads 212 are located on the non-isolated processor 210D, and four threads 212 are located on the non-isolated processor 210E.

An isolated processor set 214 includes three isolated processors 216A-C. The isolated processors 216A-C may have been identified by an operating system configuration parameter, such as the LINUX isolcpus boot parameter, which specifies the identifiers of processors to be isolated from kernel scheduling and other kernel operations. Accordingly, the isolated processors 216A-C are excluded from a scope of load balancing performed by the kernel scheduler 112, and the kernel scheduler 112 does not perform scheduling for the isolated processors 216A-C. Six running threads 218A-F have been started on isolated processor 216A, and remain on processor 216A, e.g., because the application does not perform task management operations that would start threads on different isolated processors 216B-C or move threads to different isolated processors. The number of threads is thus not balanced between the isolated processors 216A-C, as can be seen by the placement of the six example threads 218A-E on a single isolated processor 216A and the placement of no example threads on the isolated processors 216B, 216C. Although threads 212, 218 are shown, other units of execution, such as processes, may similarly be scheduled and load-balanced by the scheduler 112.

Figure 2B:
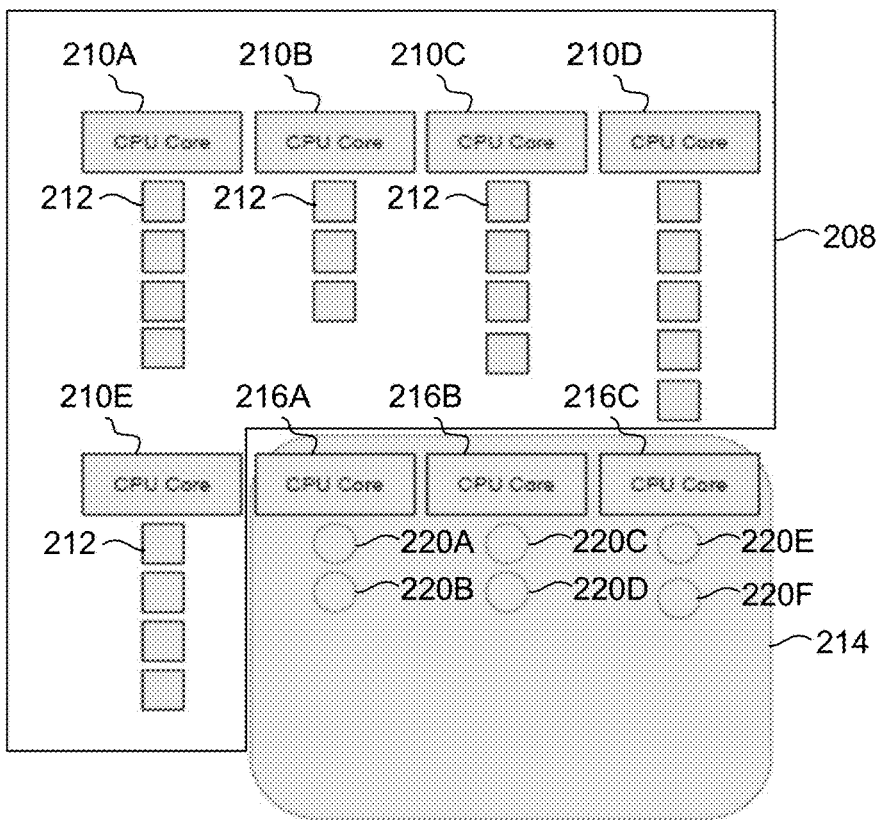
FIG. 2B depicts a diagram illustrating scheduling of tasks on a set of non-isolated processors and a set of isolated processors, in accordance with one or more aspects of the present disclosure.

FIG. 2B depicts a diagram illustrating scheduling of tasks on a set of non-isolated processors and a set of isolated processors, in accordance with one or more aspects of the present disclosure. As described above with respect to FIG. 2A, a non-isolated processor set 208 includes five non-isolated processors 210A-E. A kernel scheduler 112 performs load-balancing of running threads 212 on non-isolated processors 210A-E by scheduling the threads 212 on the non-isolated processors 210A-E.

In FIG. 2B, kernel scheduling of threads on an isolated processor set 214 is performed in accordance with embodiments described herein. Kernel scheduling of threads on isolated processor sets may be performed if, for example, a particular operating system configuration parameter has been specified to enable such scheduling. As can be seen, the kernel scheduler 112 performs scheduling of threads 220A-F on the three isolated processors 216A-C. The kernel scheduling includes performing load balancing of the threads 220A-F across the three isolated processors 216A-C. The kernel scheduler has placed threads 220A and 220B on isolated processor 216A, threads 220C and 220D on isolated processor 216B, and threads 220E and 220F on isolated processor 216C. The threads 220 are balanced between the isolated processors 216A-C, as can be seen by the number of threads on each of the isolated processors 216A-C being similar (two threads per processor).

Figure 3:
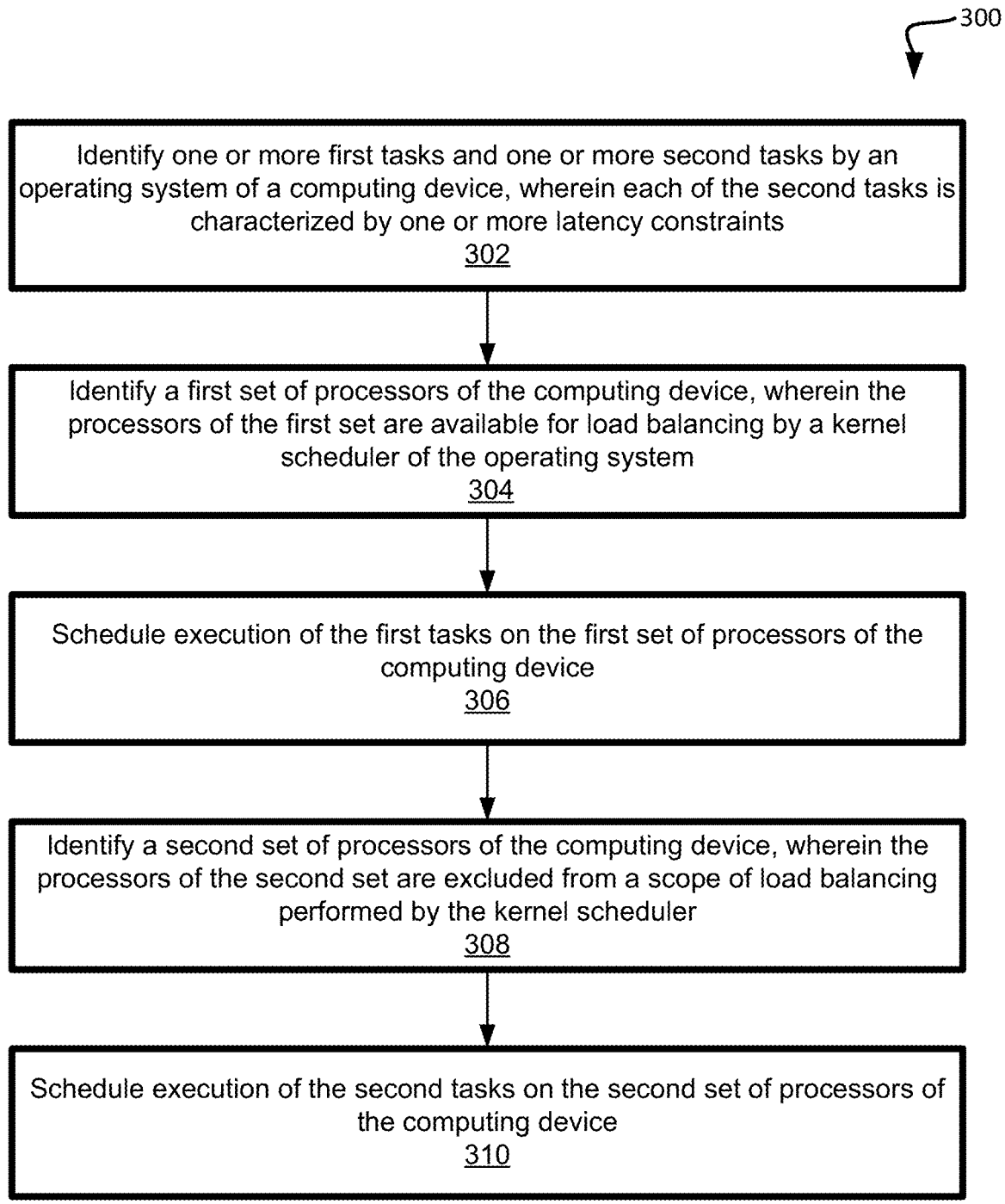
FIG. 3 depicts a flow diagram of an example method for scheduling tasks on isolated processors, in accordance with one or more aspects of the present disclosure.

FIG. 3 depicts a flow diagram of an example method for scheduling tasks on isolated processors, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by an operating system kernel as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by a computing device and may begin at block 302. At block 302, a computing device may identify one or more first tasks and one or more second tasks by an operating system of the computing device, wherein each of the second tasks is characterized by one or more latency constraints.

At block 304, the computing device may identify a first set of processors of the computing device, wherein the processors of the first set are available for load balancing by a kernel scheduler of the operating system. At block 306, the computing device may schedule execution of the first tasks on the first set of processors of the computing device.

At block 308, the computing device may identify a second set of processors of the computing device, wherein the processors of the second set are excluded from a scope of load balancing performed by the kernel scheduler. At block 310, the computing device may schedule execution of the second tasks on the second set of processors of the computing device. Responsive to completing the operations described herein above with references to block 310, the method may terminate.

Figures 4A, 4B:
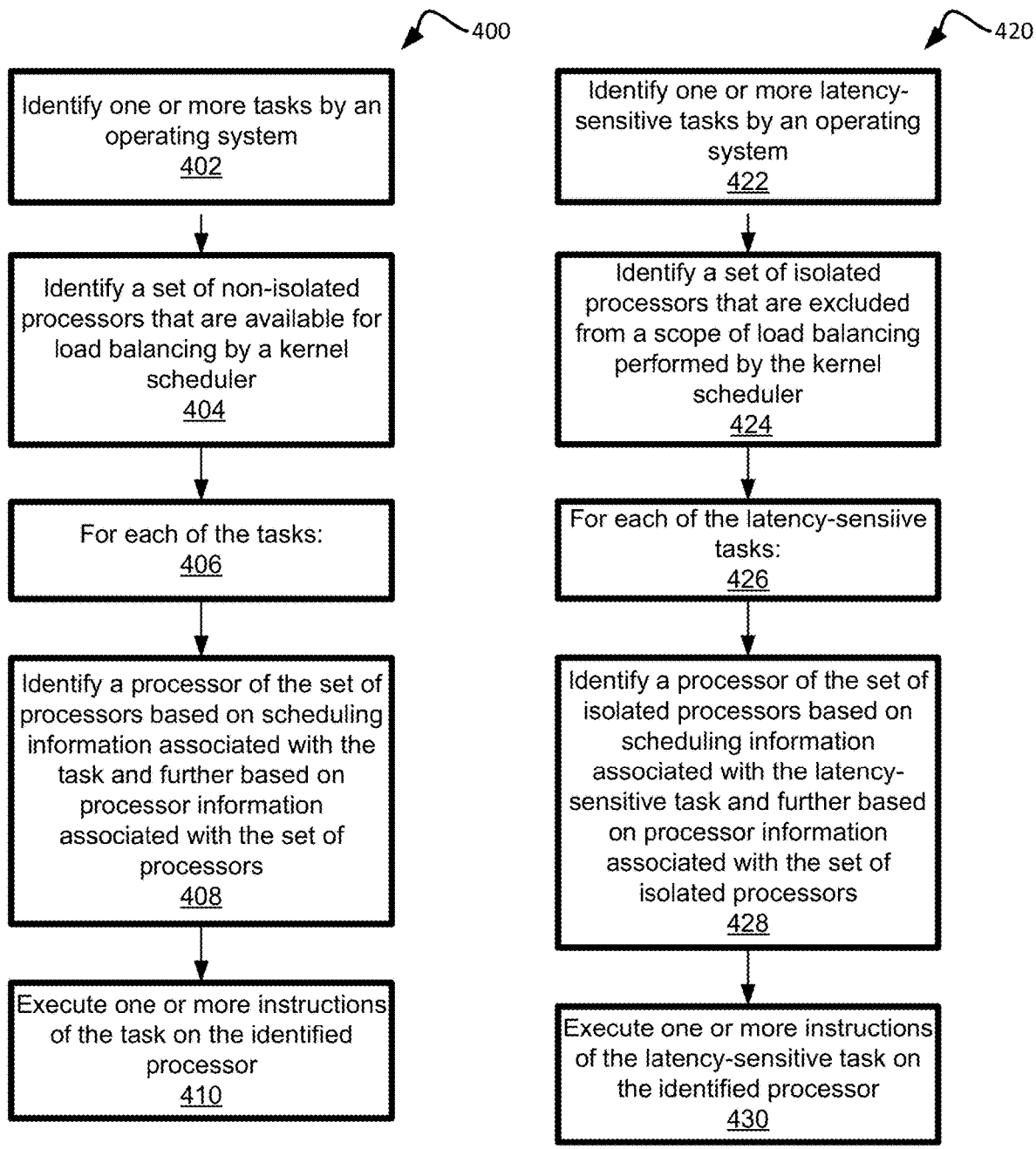
FIGS. 4A and 4B depict flow diagrams of example methods for scheduling tasks on isolated processors, in accordance with one or more aspects of the present disclosure.

FIG. 4A depicts a flow diagram of an example method 400 for scheduling tasks on isolated processors, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

In one implementation, method 400 may be performed by an operating system kernel as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by a computing device and may begin at block 402. At block 402, a computing device may identify one or more tasks by an operating system. The tasks may be, for example, non-latency-sensitive tasks. At block 404, the computing device may identify a set of non-isolated processors that are available for load balancing by a kernel scheduler.

At block 406, the computing device may begin a loop that performs blocks 408 and 410 for each of the identified tasks. At block 408, the computing device may identify a processor of the set of processors based on scheduling information associated with the task and further based on processor information associated with the set of processors. The scheduling information may include, for example, an amount of processor time that has been used by the task, a priority of the task, or other suitable information. The scheduler may select the next task to run 122 based on the amount of processor time that has been used by each task. For example, a fair scheduler may select the task having the lowest amount of processor time used as the next task to run 122. The scheduler may assign time slices to each task based on the task's priority level, so that higher priority tasks execute for larger time slices. The scheduler may preempt a running task 124 when the current time slice expires and run the next task to run 122. The processor information may include a number of tasks scheduled to execute on each processor, an amount of available processing capacity of each processor, an indication of whether each processor is idle, or other suitable information. The scheduler may use the number of tasks scheduled to execute on each processor, the available processing capacity of each processor, or the indication of whether each processor is idle to select the processor on which a task is to be run. For example, when selecting the processor on which the next task to run 122 is to be run, the scheduler may identify the processor having the least number of tasks scheduled to execute, the greatest available processing capacity, the processor that is idle, the processor that has been idle for the longest amount of continuous time, or a combination of those factors. At block 410, the computing device may execute one or more instructions of the task on the identified processor.

Responsive to completing the operations described herein above with references to block 410, and there being no further tasks in the set of tasks identified at block 404 to process, the method may terminate.

FIG. 4B depicts a flow diagram of an example method 420 for scheduling tasks on isolated processors, in accordance with one or more aspects of the present disclosure. Method 420 and each of its individual functions, routines, subroutines, or operations may be performed by one or more processors of the computer device executing the method. In certain implementations, method 420 may be performed by a single processing thread. Alternatively, method 420 may be performed by two or more processing threads, each thread executing one or more individual functions, routines, subroutines, or operations of the method. In an illustrative example, the processing threads implementing method 420 may be synchronized (e.g., using semaphores, critical sections, and/or other thread synchronization mechanisms). Alternatively, the processes implementing method 420 may be executed asynchronously with respect to each other.

In one implementation, method 420 may be performed by an operating system kernel as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 420 may be performed by a computing device and may begin at block 422. At block 422, a computing device may identify one or more latency-sensitive tasks by an operating system. At block 424, the computing device may identify a set of isolated processors that are excluded from a scope of load balancing performed by the kernel scheduler.

At block 426, the computing device may begin a loop that performs blocks 428 and 430 for each of the identified latency-sensitive tasks. At block 428, the computing device may identify a processor of the set of isolated processors based on scheduling information associated with the latency-sensitive task and further based on processor information associated with the set of isolated processors. The scheduling information may include, for example, an amount of processor time that has been used by the latency-sensitive task, a priority of the latency-sensitive task, or other suitable information. The scheduler may select the next latency-sensitive task to run based on the amount of processor time that has been used by each latency-sensitive task. For example, a fair scheduler may select the latency-sensitive task having the lowest amount of processor time used as the next latency-sensitive task to run. The scheduler may assign time slices to each latency-sensitive task based on the task's priority level, so that higher priority tasks execute for larger time slices. The scheduler may preempt a running latency-sensitive task 124 when the current time slice expires and run the next latency-sensitive task to run 122. The processor information may include a number of latency-sensitive tasks scheduled to execute on each isolated processor, an amount of available processing capacity of each isolated processor, an indication of whether each isolated processor is idle, or other suitable information. The scheduler may use the number of latency-sensitive tasks scheduled to execute on each processor, the available processing capacity of each isolated processor, or the indication of whether each isolated processor is idle to select the processor on which a latency-sensitive task is to be run. For example, when selecting the isolated processor on which the next latency-sensitive task to run 122 is to be run, the scheduler may identify the isolated processor having the least number of latency-sensitive tasks scheduled to execute, the greatest available processing capacity, the isolated processor that is idle, the isolated processor that has been idle for the longest amount of continuous time, or a combination of those factors. At block 430, the computing device may execute one or more instructions of the latency-sensitive task on the identified processor.

If block 428 identifies an isolated processor that is different from an isolated processor on which the task is currently located (e.g., an isolated processor on which the task has previously executed, which may be referred to herein as a previously-scheduled processor), then the task may be moved to the identified target processor, e.g., by the scheduler. The task may be moved by, for example, updating the task information associated with the task or other data structure to identify the target processor, and making task context information such as processor register values available to the target processor, if appropriate, and performing any other operations that may be involved in moving the task between processors. Responsive to completing the operations described herein above with references to block 430, and there being no further tasks in the set of tasks identified at block 424 to process, the method may terminate.

Figure 5:
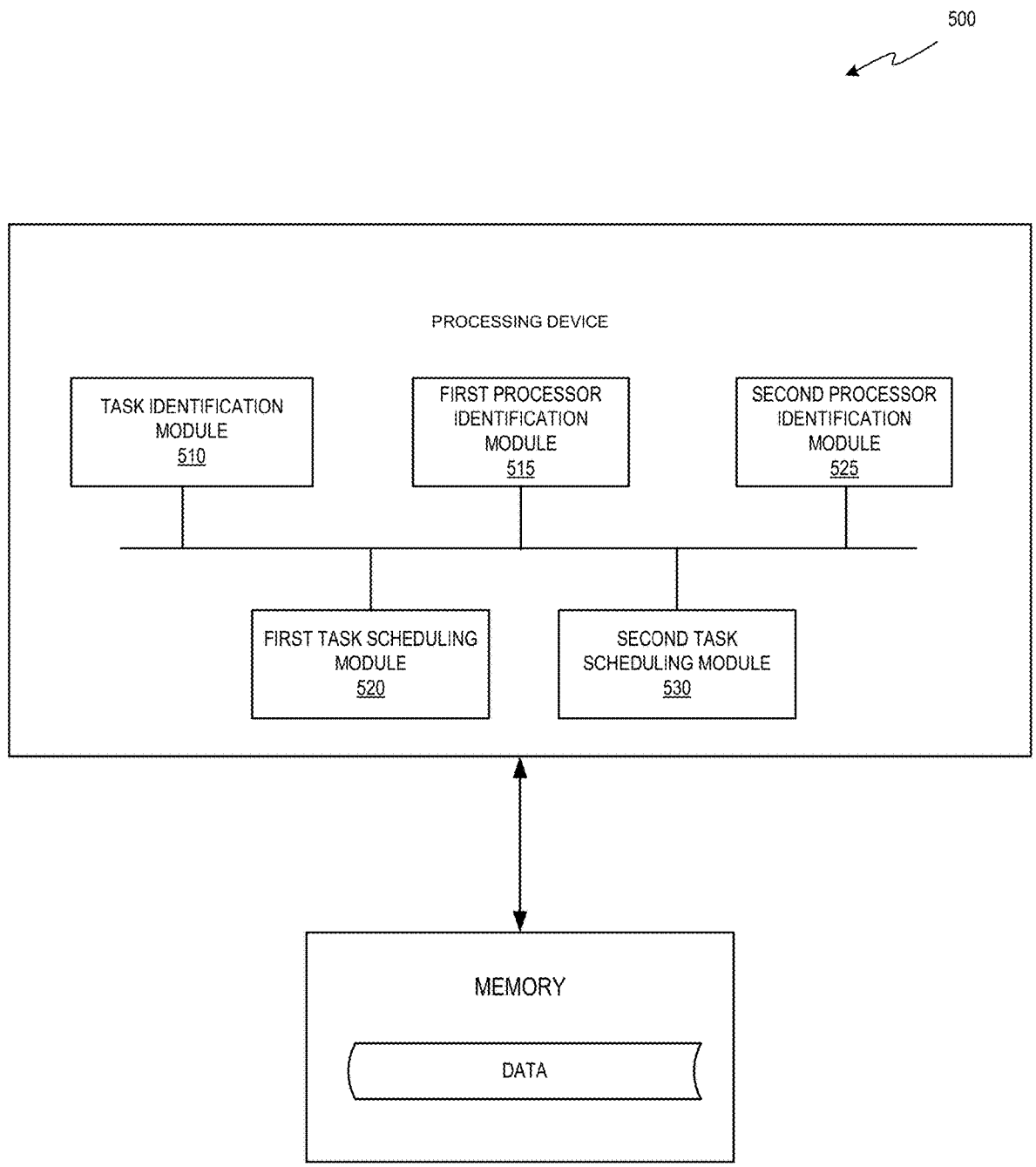
FIGS. 5 and 6 depict block diagrams of example computer systems operating in accordance with one or more aspects of the present disclosure.

FIG. 5 depicts a block diagram of a computer system 500 operating in accordance with one or more aspects of the present disclosure. Computer system 500 may be the same or similar to computing device 100 of FIG. 1, and may include one or more processors and one or more memory devices. In the example shown, computer system 500 may include a task identification module 510, a first processor identification module 515, a first task scheduling module 520, a second processor identification module 525, and second task scheduling module 530.

Task identification module 510 may enable a processor (which may be one of the processors of the computer system 500) to identify one or more first tasks and one or more second tasks in an operating system of computer system 500, wherein each of the second tasks is characterized by one or more latency constraints. The latency constraints may include a threshold response time, for example.

First processor identification module 515 may enable the processor to identify a first set of processors of the computer system 500, wherein the processors of the first set are available for load balancing by a kernel scheduler of the operating system. The first set of processors may include a plurality of non-isolated processors, for example.

First task scheduling module 520 may enable the processor to schedule execution of the first tasks on the first set of processors of the computer system 500. Scheduling execution of the first tasks on the first set of processors may include, for each of the first tasks: identifying a first processor of the first set of processors in view of scheduling information associated with the first task and further in view of information associated with the first set of processors.

Second processor identification module 525 may enable the processor to identify a second set of processors of the computer system 500, wherein the processors of the second set are excluded from a scope of load balancing performed by the kernel scheduler. The second set of processors may include a plurality of isolated processors, for example.

Second task scheduling module 530 may cause the processor to schedule execution of the second tasks on the second set of processors of the computer system 500. Scheduling execution of the second tasks on the second set of processors may include, for each of the second tasks: identifying a second processor of the second set of processors in view of scheduling information associated with the second task and further in view of processor information associated with the second set of processors.

Figure 6:
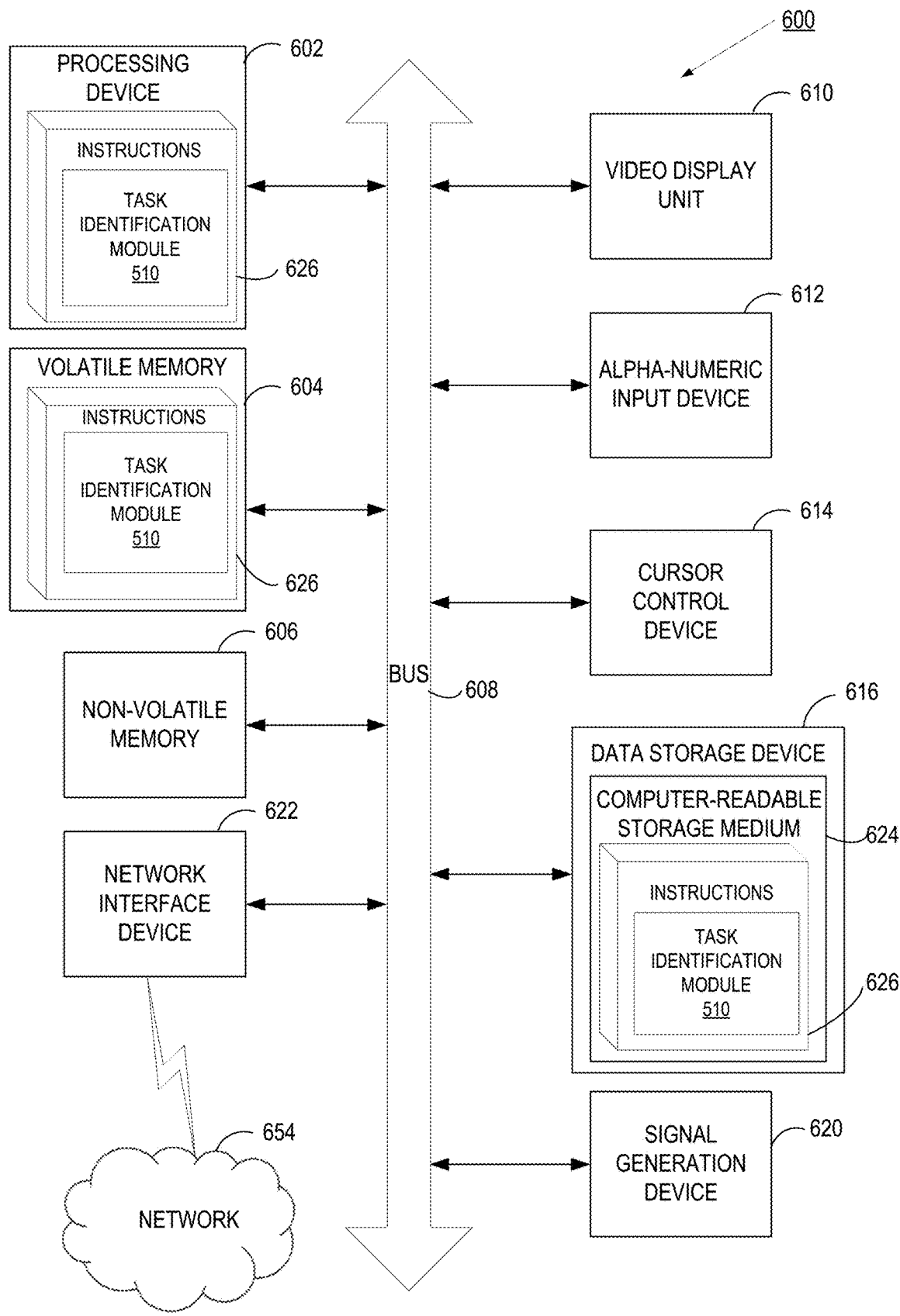

FIG. 6 depicts a block diagram of a computer system operating in accordance with one or more aspects of the present disclosure. In various illustrative examples, computer system 600 may correspond to computing device 100 of FIG. 1. In certain implementations, computer system 600 may be connected (e.g., via a network 654, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method(s) 300, 400, or 420 and for encoding component 144 of FIG. 1.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, 400, or 420 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method for load balancing latency-sensitive tasks on isolated processors, comprising:
   identifying one or more first tasks and one or more second tasks by an operating system of a computing device, wherein each of the second tasks is a latency-sensitive task characterized by one or more latency constraints;
   identifying a priority level of each task of the one or more first tasks and a priority level of each task of the one or more second tasks;
   identifying a first set of processors of the computing device, wherein the processors of the first set are non-isolated processors load balanced by a kernel scheduler of the operating system;
   assigning, based on the priority level of each task of the one or more first tasks, a time slice to each task of the one or more first tasks, wherein a higher priority task corresponds to a larger time slice;
   scheduling execution of the one or more first tasks on the first set of processors of the computing device, wherein each of the one or more first tasks is executed according to its respective assigned time slice;
   identifying a second set of processors of the computing device, wherein the processors of the second set are isolated processors excluded from a scope of load balancing performed by the kernel scheduler;
   identifying a first processor of the second set of processors in view of a number of latency-sensitive tasks scheduled to execute on each processor of the second set of processors and an amount of available processing capacity of each processor of the second set of processors, wherein the first processor of the second set of processors has a least number of latency-sensitive tasks scheduled to execute of the second set of processors and a greatest amount of available processing capacity of each processor of the second set of processors;
   identifying, from the one or more second tasks, a next task in view of an amount of processor time that has been used by each of the one or more second tasks and the priority level of the next task; and
   executing, by the computing device, one or more instructions of the next task on the first processor of the second set of processors.

2. The method of claim 1, wherein scheduling execution of the first tasks on the first set of processors of the computing device comprises:
   identifying a first processor of the first set of processors in view of one or more of:
   a number of tasks scheduled to execute on each processor of the first set of processors, an amount of available processing capacity of each processor of the first set of processors, or an indication of whether each processor of the first set of processors is idle.

3. The method of claim 1, wherein the next task has the lowest amount of processor time used of the one or more second tasks.

4. The method of claim 1, wherein the first processor of the second set of processors is identified further in view of an indication of whether each processor of the second set of processors is idle.

5. The method of claim 1, wherein the next task has previously executed on a previously-scheduled processor of the second set, and the first processor is different from the previously-scheduled processor, the method further comprising:

moving the next task from the previously-scheduled processor to the first processor, wherein moving the next task comprises:

updating a task information data structure associated with the next task, wherein the updated task information data structure identifies the first processor, and providing task context information associated with the next task to the first processor.

6. The method of claim 1, wherein each task comprises one or more of a process or a thread.

7. The method of claim 1, wherein the latency constraints comprise a threshold response time.

8. A system for load balancing latency-sensitive tasks on isolated processors, comprising:

a memory; and a processing device communicably coupled to the memory, the processing device to:

identify one or more first tasks and one or more second tasks by an operating system of a computing device, wherein each of the second tasks is a latency-sensitive task characterized by one or more latency constraints;

identify a priority level of each task of the one or more first tasks and a priority level of each task of the one or more second tasks;

identify a first set of processors of the computing device, wherein the processors of the first set are non-isolated processors load balanced by a kernel scheduler of the operating system;

assign, based on the priority level of each task of the one or more first tasks, a time slice to each task of the one or more first tasks, wherein a higher priority task corresponds to a larger time slice;

schedule execution of the one or more first tasks on the first set of processors of the computing device, wherein each of the one or more first tasks is executed according to its respective assigned time slice;

identify a second set of processors of the computing device, wherein the processors of the second set are isolated processors excluded from a scope of load balancing performed by the kernel scheduler;

identify a first processor of the second set of processors in view of a number of latency-sensitive tasks scheduled to execute on each processor of the second set of processors and an amount of available processing capacity of each processor of the second set of processors, wherein the first processor of the second set of processors has a least number of latency-sensitive tasks scheduled to execute of the second set of processors and a greatest amount of available processing capacity of each processor of the second set of processors;

identify, from the one or more second tasks, a next task in view of an amount of processor time that has been used by each of the one or more second tasks and the priority level of the next task; and execute one or more instructions of the next task on the first processor of the second set of processors.

9. The system of claim 8, to schedule execution of the first tasks on the first set of processors of the computing device, the processing device is further to:

identify a first processor of the first set of processors in view of one or more of:

a number of tasks scheduled to execute on each processor of the first set of processors, an amount of available processing capacity of each processor of the first set of processors, or an indication of whether each processor of the first set of processors is idle.

10. The system of claim 8, wherein the next task has the lowest amount of processor time used of the one or more second tasks.

11. A non-transitory machine-readable storage medium storing instructions for load balancing latency-sensitive tasks on isolated processors that cause a processing device to:

identify one or more first tasks and one or more second tasks by an operating system of a computing device, wherein each of the second tasks is a latency-sensitive task characterized by one or more latency constraints;

identify a priority level of each task of the one or more first tasks and a priority level of each task of the one or more second tasks;

identify a first set of processors of the computing device, wherein the processors of the first set are non-isolated processors load balanced by a kernel scheduler of the operating system;

assign, based on the priority level of each task of the one or more first tasks, a time slice to each task of the one or more first tasks, wherein a higher priority task corresponds to a larger time slice;

schedule execution of the one or more first tasks on the first set of processors of the computing device, wherein each of the one or more first tasks is executed according to its respective assigned time slice;

identify a second set of processors of the computing device, wherein the processors of the second set are isolated processors excluded from a scope of load balancing performed by the kernel scheduler;

identify a first processor of the second set of processors in view of a number of latency-sensitive tasks scheduled to execute on each processor of the second set of processors and an amount of available processing capacity of each processor of the second set of processors, wherein the first processor of the second set of processors has a least number of latency-sensitive tasks scheduled to execute of the second set of processors and a greatest amount of available processing capacity of each processor of the second set of processors;

identify, from the one or more second tasks, a next task in view of an amount of processor time that has been used by each of the one or more second tasks and the priority level of the next task; and execute one or more instructions of the next task on the first processor of the second set of processors.

12. The non-transitory machine-readable storage medium of claim 11, to schedule execution of the first tasks on the first set of processors of the computing device, the processing device is further to:

identify a first processor of the first set of processors in view of one or more of:
a number of tasks scheduled to execute on each processor of the first set of processors, an amount of available processing capacity of each processor of the first set of processors, or
an indication of whether each processor of the first set of processors is idle.

13. The non-transitory machine-readable storage medium of claim 11, wherein the next task has the lowest amount of processor time used of the one or more second tasks.

* * * * *